United States Patent
Harper et al.

(10) Patent No.: US 10,256,626 B2
(45) Date of Patent: Apr. 9, 2019

(54) METHODS AND SYSTEMS OF IMPEDANCE SOURCE SEMICONDUCTOR DEVICE PROTECTION

(71) Applicant: DRS Power & Control Technologies, Inc., Milwaukee, WI (US)

(72) Inventors: Christopher Harper, Glendale, WI (US); Jeffery Fischer, Cedarburg, WI (US); Ian Wallace, Whitefish Bay, WI (US)

(73) Assignee: DRS Power & Control Technologies, Inc., Milwaukee, WI (US)

( * ) Notice: Subject to any disclaimer, the term of this patent is extended or adjusted under 35 U.S.C. 154(b) by 272 days.

(21) Appl. No.: 15/222,846

(22) Filed: Jul. 28, 2016

(65) Prior Publication Data

US 2016/0336743 A1    Nov. 17, 2016

Related U.S. Application Data (62) Division of application No. 14/169,555, filed on Jan. 31, 2014, now Pat. No. 9,431,819.

(51) Int. Cl.
*H02H 9/00* (2006.01)
*H02H 9/04* (2006.01)

(52) U.S. Cl.
CPC ............ *H02H 9/045* (2013.01); *H02H 9/005* (2013.01)

(58) Field of Classification Search
CPC .................................................. H02H 9/045
See application file for complete search history.

(56) References Cited

U.S. PATENT DOCUMENTS

| | | | |
|---|---|---|---|
| 5,049,853 A | * | 9/1991 | Yoon .................... B06B 1/0223 340/384.73 |
| 5,907,479 A | | 5/1999 | Leu |
| 6,300,829 B1 | | 10/2001 | Luu |
| 6,493,242 B1 | | 12/2002 | Riggio et al. |
| 6,567,281 B2 | | 5/2003 | Riggio et al. |
| 6,788,005 B2 | | 9/2004 | Chu et al. |
| 6,801,443 B2 | | 10/2004 | Manthe |
| 7,242,154 B2 | | 7/2007 | Rudolph |
| 7,541,791 B2 | | 6/2009 | Quazi |
| 7,595,613 B2 | | 9/2009 | Thompson et al. |
| 7,706,161 B2 | | 4/2010 | Quazi |
| 7,855,904 B2 | | 12/2010 | Kirbie et al. |
| 8,026,691 B2 | | 9/2011 | Nagashima et al. |
| 8,094,470 B2 | | 1/2012 | Fujiyoshi et al. |
| 8,339,192 B2 | | 12/2012 | Busch |
| 8,437,483 B2 | | 5/2013 | Garg |

(Continued)

OTHER PUBLICATIONS

U.S. Appl. No. 14/169,555 , "Restriction Requirement", dated Mar. 8, 2016, 6 pages.

(Continued)

*Primary Examiner* — Stephen W Jackson
(74) *Attorney, Agent, or Firm* — Kilpatrick Townsend & Stockton LLP (57) ABSTRACT

An electrical network configured to suppress voltage transients includes a capacitor and an electrical impedance in parallel with a diode. The capacitor is in series with the parallel connected diode and electrical impedance. The electrical network is configured to suppress voltage transients occurring across the series combination of the capacitor and the parallel connected diode and electrical impedance.

30 Claims, 7 Drawing Sheets

(56) References Cited

U.S. PATENT DOCUMENTS

| | | |
|---|---|---|
| 9,093,977 B2 | 7/2015 | Jin et al. |
| 9,431,819 B2 | 8/2016 | Fischer et al. |
| 2003/0231518 A1 | 12/2003 | Peng |
| 2007/0217235 A1 | 9/2007 | Quazi |
| 2008/0211347 A1 | 9/2008 | Wright et al. |
| 2009/0033254 A1 | 2/2009 | Nagashima et al. |
| 2011/0032737 A1 | 2/2011 | Rincent et al. |
| 2012/0081081 A1 | 4/2012 | Walters |
| 2012/0169429 A1 | 7/2012 | Pohl |
| 2013/0063219 A1 | 3/2013 | Shanan |
| 2013/0214616 A1 | 8/2013 | Farbiz et al. |
| 2015/0222114 A1 | 8/2015 | Harper et al. |

OTHER PUBLICATIONS

Templeton, George. "RC Snubber Networks for Thyristor Power Control and Transient Suppresion", ON Semiconductor [online], Jun. 2008, pp. 1-22, [retrieved on Jan. 30, 2014]. Retrieved from the Internet: <http://www.onsemi.com/pub_link/Collateral/AN1048-D.PDF>.

Nguyen, et al., "Single-Phase Z-Source AC/AC Converter with Wide Range Output Voltage Operation", *Journal of Power Electronics* [online], vol. 9, No. 5 (Sep. 2009), pp. 736-747, [retrieved on Jan. 30, 2014]. Retrieved from the Internet: <http://review.jpe.or.kr/On_line/admin/paper/files/8-JPE%2009-48.pdf>.

Rajakaruna, et al., "Steady-State Analysis and Designing Impedance Network of Z-Source Inverters", *IEEE Transactions on Industrial Electronics* [online], vol. 57, No. 7 (Jul. 2010), pp. 2483-2491, [retrieved on Jan. 30, 2014]. Retrieved from the Internet: < http://espace.library.curtin.edu.au/R/?func=dbin-jump-full&object_id=142935&local_base=GEN01-ERA02>.

"Protecting AC Output SSRs against voltage transient phenomena", Crydom [online], Jan. 2012, pp. 1-5, [retrieved on Jan. 30, 2014]. Retrieved from the Internet: <http://www.crydom.com/en/Tech/Newsletters/Solid%20Statements%20-%20Protecting%20AC%20Output%20SSRs%20against%20voltage%20transient%20phenomena.pdf>.

Park, et al., "Improving Output Performance of a Z-Source Sparse Matrix Converter Under Unbalanced Input-Voltage Conditions", *IEEE Transactions on Power Electronics* [online], vol. 27, No. 4 (Apr. 2012), pp. 2043-2053, [retrieved from the Internet Jan. 30, 2014]. Retrieved from the Internet: <http://pel.ajou.ac.kr/paper/international_journals/42.pdf>.

Tseng, et al., "Interleaved step-up converter with a single-capacitor snubber for PV energy conversion applications", International Journal of Electrical Power & Energy Systems [online], vol. 53 (Dec. 2013), pp. 909-922, [retrieved on Jan. 30, 2014]. Retrieved from the Internet: <http://www.sciencedirect.com/science/article/pii/S0142061513002676>.

U.S. Appl. No. 14/169,555, Notice of Allowance dated Apr. 28, 2016, 8 pages.

* cited by examiner

METHODS AND SYSTEMS OF IMPEDANCE SOURCE SEMICONDUCTOR DEVICE PROTECTION

CROSS-REFERENCES TO RELATED APPLICATIONS

This application is a divisional of U.S. patent application Ser. No. 14/169,555, filed Jan. 31, 2014, the disclosure of which is hereby incorporated by reference in its entirety for all purposes.

FIELD OF THE INVENTION

The present invention generally relates to Z source networks, and more particularly to circuits for snubbing transients in Z source networks.

BACKGROUND OF THE INVENTION

Figure 1:
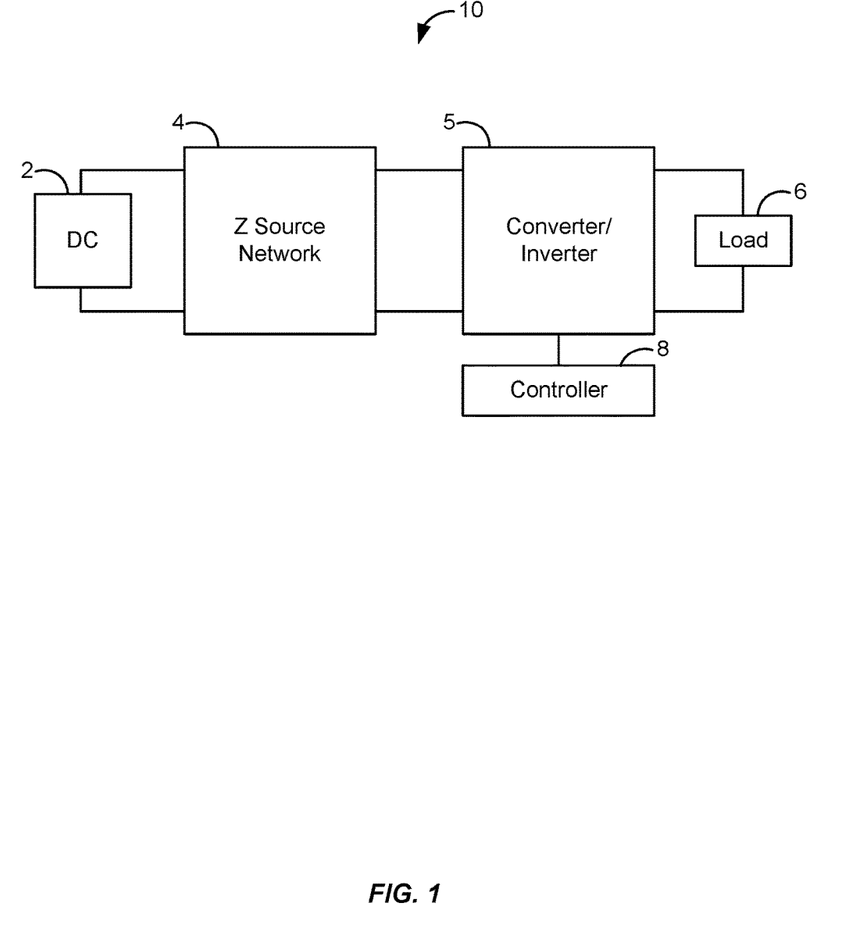
FIG. 1 is a block diagram of an electronic system.

FIG. 1 is a block diagram of an electronic system 10. Electronic system 10 includes a DC source 2 which provides power to load 6 through Z source network 4 and converter/inverter 5. Converter/inverter 5 is controlled by controller 8.

DC (Direct Current) source 2 may be a current or a voltage source. For example, DC source 2 may include one or more of a battery, a diode rectifier, a thyristor converter, a fuel cell, an inductor, a capacitor, a transistor, and a current source. Other DC sources may additionally or alternatively be used.

Converter/inverter 5 may be comprised to perform any of DC to AC power conversion, AC to DC power conversion, AC to AC power conversion, and DC to DC power conversion. For example, converter/inverter 5 may comprise a three-phase inverter configured to receive a DC power voltage and to provide power in 3 phases to an AC motor load. Converter/inverter 5 includes switches which are controlled by signals from a controller 8.

The Z source network 4 receives DC power from DC source 2 and provides power to converter/inverter 5. The Z source network for maybe configured to provide power, for example, outside of the DC range of the output of DC power source 2.

Because of the switching operation of the converter/inverter 5, the Z source network 4 experiences a switched load, which may cause voltage and current spikes. In some circumstances, the transient spikes may damage circuitry. To ensure reliability, components are oversized, which causes current systems to be expensive, slow, and power inefficient.

SUMMARY OF THE INVENTION

One inventive aspect is an electrical network configured to suppress voltage transients. The network includes a capacitor and an electrical impedance in parallel with a diode. The capacitor is in series with the parallel connected diode and electrical impedance, and the electrical network is configured to suppress voltage transients occurring across the series combination of the capacitor and the parallel connected diode and electrical impedance.

Another inventive aspect is a Z source network, including positive and negative input terminals, a shunt capacitor connected to the positive and negative input terminals, and a diode having an anode connected to the positive input terminal and a cathode connected to an internal node of the Z source network. The Z source network also includes positive and negative output terminals, a first inductor connected to the inner node and to the positive output terminal, and a first capacitor connected to the inner node and to the negative output terminal. The Z source network also includes a second inductor connected to the negative input terminal and to the negative output terminal, a second capacitor connected to the negative input terminal and the positive output terminal, and an electrical network configured to suppress voltage transients. The network is includes a capacitor and an electrical impedance in parallel with a diode. The capacitor is in series with the parallel connected diode and electrical impedance, and the electrical network is configured to suppress voltage transients occurring across the positive and negative input terminals.

Another inventive aspect is an electrical network configured to suppress voltage transients. The network includes a first capacitor and an electrical impedance in parallel with a diode, where the first capacitor is in series with the parallel connected diode and electrical impedance. The network also includes second and third capacitors, where the second and third capacitors are in series with the first capacitor and the parallel connected diode and electrical impedance. The electrical network is configured to suppress voltage transients occurring across the series combination of the first capacitor, the parallel connected diode and electrical impedance, the second capacitor and the third capacitor.

Another inventive aspect is a Z source network, including positive and negative input terminals, a shunt capacitor connected to the positive and negative input terminals, and a diode having an anode connected to the positive input terminal and a cathode connected to an internal node of the Z source network. The Z source network also includes positive and negative output terminals, a first inductor connected to the inner node and to the positive output terminal, and a first capacitor connected to the inner node and to the negative output terminal. The Z source network also includes a second inductor connected to the negative input terminal and to the negative output terminal, a second capacitor connected to the negative input terminal and the positive output terminal, and an electrical network configured to suppress voltage transients. The electrical network includes a first capacitor and an electrical impedance in parallel with a diode, where the first capacitor is in series with the parallel connected diode and electrical impedance. The electrical network also includes second and third capacitors, where the second and third capacitors are in series with the first capacitor and the parallel connected diode and electrical impedance. The electrical network is configured to suppress voltage transients occurring across the positive and negative output terminals.

BRIEF DESCRIPTION OF THE DRAWINGS

The accompanying drawings, which are incorporated in and constitute a part of this specification, illustrate implementations of inventive concepts and, together with the description, serve to explain various advantages and principles of the invention.

DETAILED DESCRIPTION OF THE INVENTION

Reference is made to implementations illustrated in the accompanying drawings. The same reference numbers are generally used throughout the drawings and the following description to refer to the same or like elements.

The electrical power conversion field is generally understood to have three fundamental conversion topologies: voltage source converters, current source converters, and impedance (or Z) source converters. The three types are defined by the network topology used to store energy.

A voltage source converter (VSC) utilizes an energy storage network that stores energy as a change in a voltage, such as the voltage across a capacitor. The energy storage element, storing and releasing energy at a rate based on the difference in voltage, is capable of sourcing and sinking a large amount of current and is not able to attain a voltage higher than the source voltage. A voltage source converter may provide unlimited fault current, limited fault voltage, and may have a bucked voltage output. Due to this behavior, the network of a voltage source converter is not protected from a short circuit at the output.

A current source converter (CSC) relies on an energy storage network that stores energy as a change in a current, such as the current flowing through an inductor. Since the energy storage element stores and releases energy at a rate based on the difference in current, the converter can provide very large changes in voltage and can provide a voltage higher than the source voltage. A current source converter may provide limited fault current, unlimited fault voltage, and may have a boosted voltage output. Due to this behavior, the network of a current source converter is not protected from an open circuit at the output.

An impedance source (ZSC or Z-Source Converter) relies on an energy storage network that exhibits properties of both voltage and current source converter types. A Z-Source network stores energy, for example, in both inductive and capacitive storage elements where the elements are in series, and the effects of either the inductive or the capacitive dominate at different frequencies or energy storage levels. The series combination allows both the fault current (short circuit) and fault voltage (open circuit) to be limited while also allowing the network to buck or boost the output voltage relative to the input. In response to a short circuit at the output terminals, the Z-Source network stores energy in the inductive elements. In response to an open-circuit applied to the output terminals, the Z-Source network stores energy in the capacitive elements.

Figure 2:
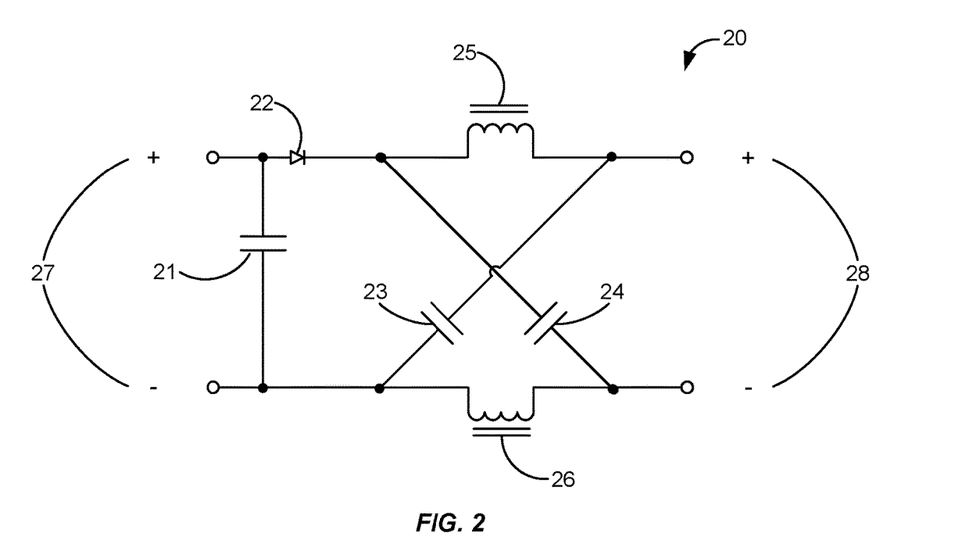
FIG. 2 is a schematic diagram of a Z source network, which can be used in the system of FIG. 1.

FIG. 2 is a schematic diagram of a Z source network 20, which can be used in the system of FIG. 1. Z source network 20 includes shunt capacitor 21, rectifier diode 22, cross coupled capacitors 23 and 24, inductors 25 and 26, positive and negative input terminals 27, and positive and negative output terminals 28. As discussed in more detail below, Z source network 20 performs well even when being open or short circuited.

Figure 3:
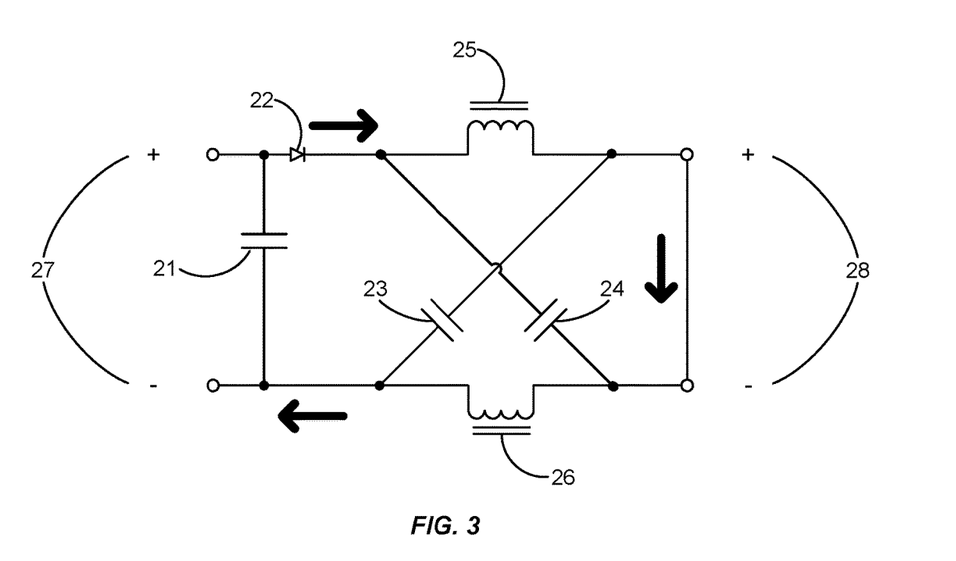
FIGS. 3-5 show current flow within the Z-Source network of FIG. 2 under various load conditions.

FIG. 3 shows the current flow within the Z-Source network as the output is short-circuited. While short-circuited, current flows from the positive input terminal 27 through rectifier diode 22, through inductor 25, and out positive output terminal 28. The current then flows through the short, into negative output terminal 28, and through inductor 26 to negative input terminal 27. As the current through the inductors 25 and 26 increases, energy is stored in the inductors 25 and 26.

Figure 4:
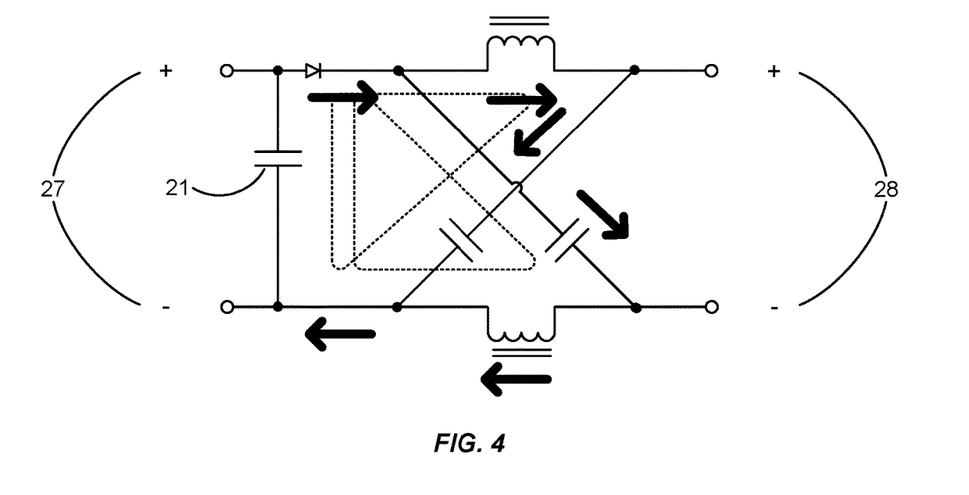

In response to the low impedance short-circuit being opened, the current flowing through the inductors 25 and 26 is forced by the stored energy in inductors 25 and 26 to flow to cross coupled capacitors 23 and 24. As a result, cross coupled capacitors 23 and 24 are charged. As shown in FIG. 4, current from the inductor 25 charges the capacitor 23, and current in the inductor 26 charges the capacitor 24 to a voltage below the negative input voltage at the negative input terminal 27.

Figure 5:
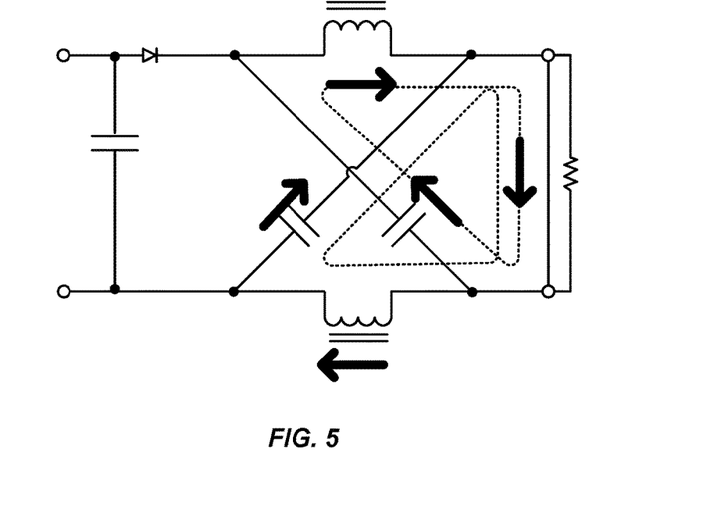

Following the decay of the current, the rectifier diode 22 blocks reverse current that would otherwise drain the cross coupled capacitors 23 and 24. Once the cross coupled capacitors 23 and 24 are thus charged, the Z-Source network can provide a boosted input voltage for use at the output terminals 28. Current flow during this condition is shown in FIG. 5.

There are numerous configurations of Z-Source networks. One embodiment is shown in FIGS. 2-5. The various aspects and principles discussed herein, while discussed as applied to the configuration shown in FIGS. 2-5, may also be applied to various other configurations and variations of Z-Source networks. In addition, the various aspects and principles discussed herein may be applied to quasi-Z-Source networks. Similarly, the various aspects and principles discussed herein are applicable to all configurations of sources and loads. For example, the source or load may be any of a voltage source, a current source, an n-level load, a breaker configuration, IGBTs, MOSFETs, SCRs, etc.

Figure 6:
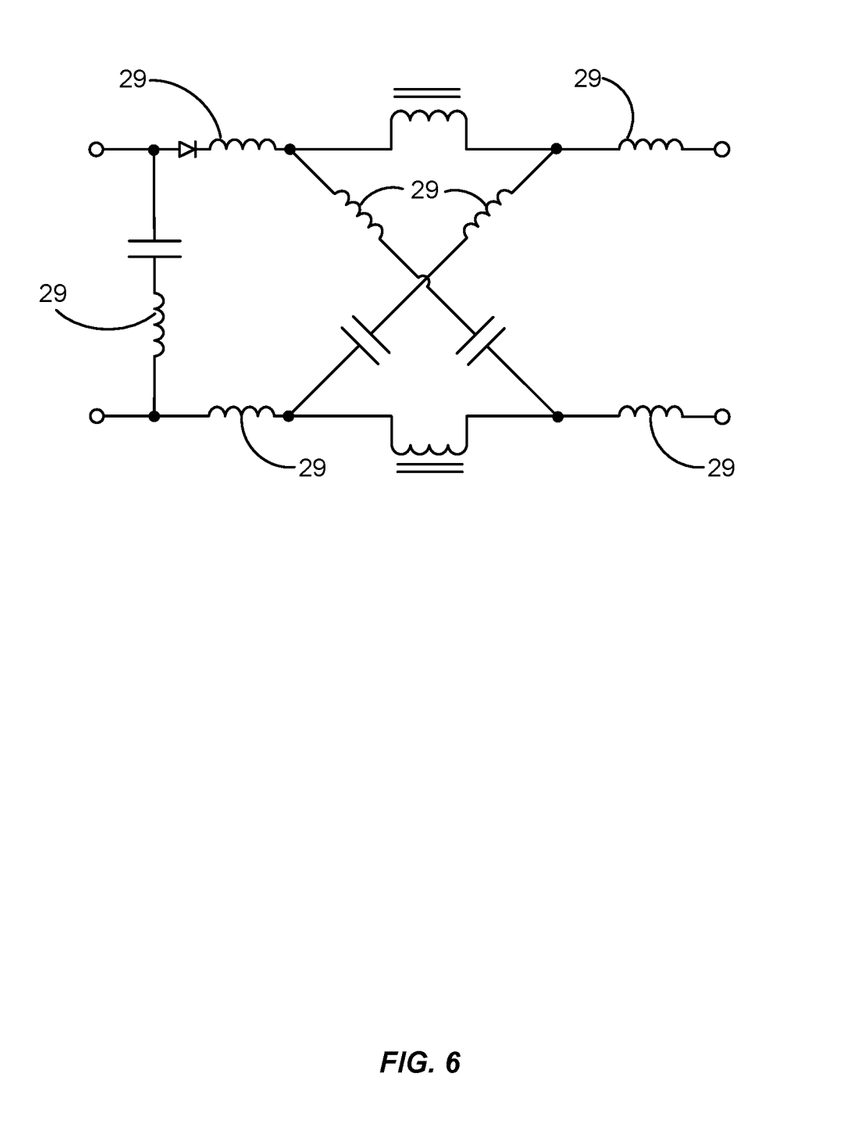
FIG. 6 is a schematic diagram of the Z source network of FIG. 2, showing parasitic inductances.

Parasitic inductances 29 of the Z-Source network 20 are shown in FIG. 6. The Z-Source network 20 provides current snubbing because the relatively large impedance network inductance from inductors 25 and 26 is in series with the capacitive discharge path of the network. This provides excellent protection for semiconductor devices during turn-on and current limiting during diode reverse recovery. However, as FIG. 6 illustrates, there are many parasitic inductance paths that contribute to voltage spikes, for example, during turn-off. When the output terminals 28 are opened with current flowing through the inductors 25 and 26, as previously discussed with reference to FIG. 3, the cross coupled capacitors 23 and 24 provide a path for the inductor current. However, parasitic inductance or equivalent series inductance (ESL), for example, in the capacitors 23 and 24, prevents the capacitors 23 and 24 from instantaneously conducting current. This delay causes a voltage spike which is seen at the output terminals 28. This is exacerbated due to the capacitors 23 and 24 being cross coupled such that the wires of the capacitors 23 and 24 are relatively long, and due to the physical size of the capacitors, which are sized to handle very high ripple currents (full output current) while providing energy storage for the impedance network.

Compounding the effect of the ESL, under typical operating conditions, the capacitors 23 and 24 can source current to the output terminals 28 when changing from a boosting state to an open circuit state. The ESL of the shunt capacitor 21 is also added to the total current path, but note that this ESL is in parallel with the input source. Note also that the shunt capacitor 21 may, in some embodiments, be part of the input source driving the network. Similarly, the ESL of the diode and lead inductance can be added to the total parasitic inductance, but the effect of this parasitic inductance is dependent on the mode of operation as current to may be flowing preceding a transient.

Figure 7:
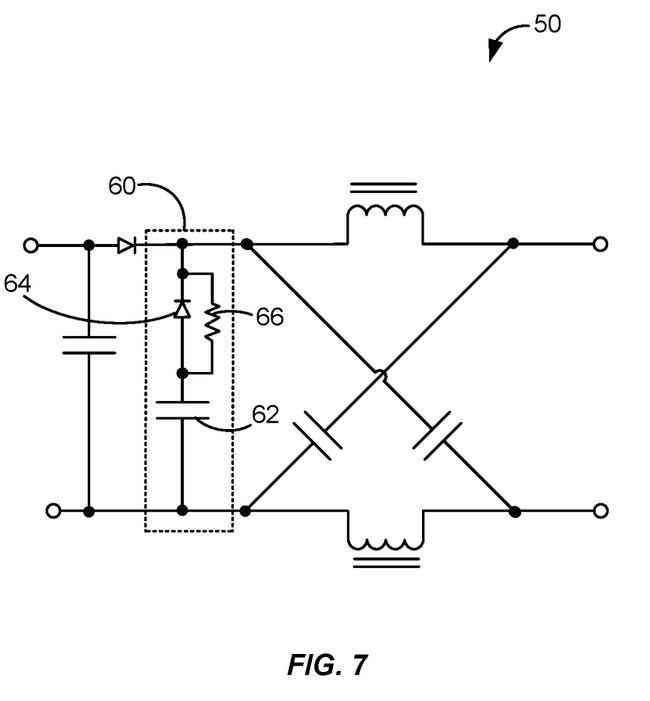
FIG. 7 is a schematic diagram of an alternative Z source network, which can be used in the system of FIG. 1.

FIG. 7 is a schematic diagram of an alternative Z source network 50, which can be used in the system of FIG. 1. Z source network 50 includes shunt capacitor 51, rectifier diode 52, cross coupled capacitors 53 and 54, inductors 55 and 56, positive and negative input terminals 57, and positive and negative output terminals 58. Z source network 50 also includes voltage snubbing circuit 60. As discussed in more detail below, snubbing circuit 60 suppresses voltage spikes which result from parasitic inductances.

Voltage snubbing circuit 60 includes capacitor 62, diode 64, and impedance element 66. In some embodiments, capacitor 62 may be much smaller than shunt capacitor 51. In such embodiments, capacitor 62 contributes an insignificant amount to the total energy storage capability of the system, and hence carries negligible current. However, the capacitor 62 can be physically much smaller, and have a lower ESL than shunt capacitor 51. The small size of capacitor 62 similarly results in a lower peak current in snubbing circuit 60, such that diode 64 may be relatively small and fast. For example diode 64 may be significantly smaller and faster than rectifier diode 52. As a result, diode 64 may have a lower ESL and faster recovery characteristics than rectifier diode 52, which is sized for carrying the full impedance network current. Voltage snubbing circuit 60 provides snubbing for the rectifier diode 52 by reducing the dv/dt of the voltage transitions at the cathode of rectifier diode 52.

Diode 64 and impedance element 66 collectively allow rapid voltage increase at the cathode of rectifier diode 52. Diode 64 and impedance element 66 also prevent capacitor 62 from forming a path which would allow current to flow through the stacked network of capacitors 62, 54, and 53 when the output terminals 58 are shorted. The impedance element 66 is sized such that the RC time constant formed by impedance element 66 and capacitor 62 is very large compared to the switching frequency of the system. This allows the capacitor 62 to be substantially permanently pre-charged (for inrush) and prevents the voltage of the capacitor 62 from charging up to the boosted voltage of the Z-Source network 50. Capacitor 62 remains charged to approximately the input voltage with very little ripple current flowing through it. In some embodiments, substantially the only ripple current flowing through capacitor 62 cancels the effect of the larger ESL of the energy-carrying network and supports recovery of diode 64. Accordingly, in such embodiments, voltage snubbing circuit 60 has no impact on the functionality of the Z-Source network 50, and substantially only serves to reduce voltage spikes.

As shown in FIG. 7, impedance element 66 includes a resistor. In some embodiments, impedance element 66 includes another impedance network. For example impedance element 66 may include one or more resistors, capacitors, or inductors.

In some embodiments, input element 66 is omitted.

As shown in FIG. 7, capacitor 62 is a single capacitor. In some embodiments, additional impedance elements are included in series or in parallel with capacitor 62.

In some embodiments, impedance element 66 is configured to be controlled so as to controllably remove energy from capacitor 62. This allows for the controlled or active suppression of transient spikes. In some embodiments, impedance element 66 may include or be an energy storage element or an energy conversion element.

In some embodiments, an energy storage element or an energy conversion element may be placed in parallel with capacitor 62. This allows for the controlled or active removal of energy from capacitor 62.

Figure 8:
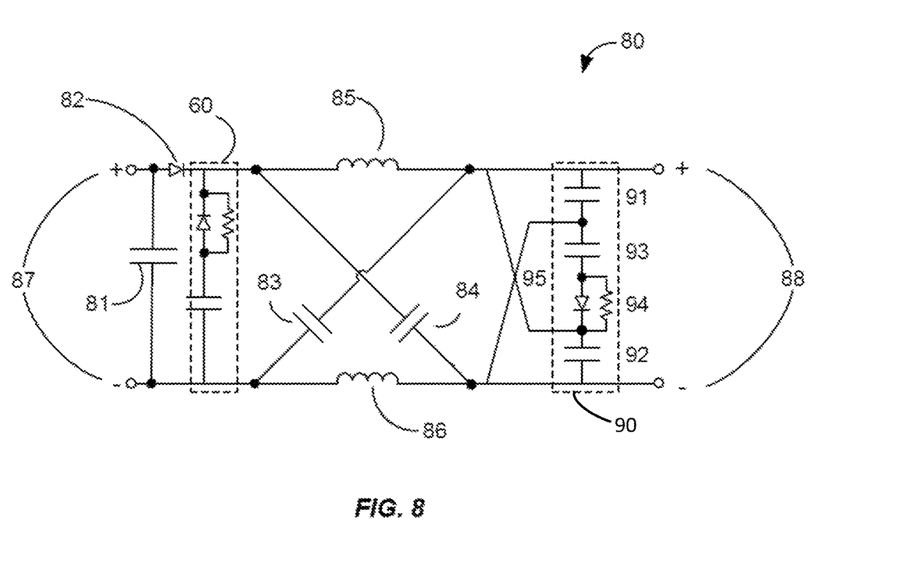
FIG. 8 is a schematic diagram of an alternative Z source network, which can be used in the system of FIG. 1.

FIG. 8 is a schematic diagram of an alternative Z source network 80, which can be used in the system of FIG. 1. Z source network 80 includes shunt capacitor 81, rectifier diode 82, cross coupled capacitors 83 and 84, inductors 85 and 86, positive and negative input terminals 87, and positive and negative output terminals 88. Z source network 80 also includes voltage snubbing circuit 60, discussed above, and voltage snubbing circuit 90. As discussed in more detail below, snubbing circuit 90 suppresses voltage spikes which result from parasitic inductances.

FIG. 8 shows snubbing circuit 90 in parallel with the remainder of Z source network 80. As shown, snubbing circuit 90 includes cross coupled capacitors 91 and 92, capacitor 93, impedance element 94, and diode 95.

The value of the cross coupled capacitors 91 and 92 is less than cross coupled capacitors 83 and 84. In some embodiments, additional resistors (not shown) are placed in series with cross coupled capacitors 91 and 92. As a result, snubbing circuit 90 carries negligible current.

The operation of capacitor 93, diode 95, and impedance element 94 is similar to the operation of snubbing circuit 60 discussed above, and is not repeated. In some embodiments, substantially the only ripple current flowing through capacitor 93 cancels the effect of the larger ESL of the energy-carrying network and supports recovery of diode 95. Accordingly, in such embodiments, voltage snubbing circuit 90 has no impact on the functionality of the Z-Source network 80, and substantially only serves to reduce voltage spikes.

Because they do not need to carry the network current, capacitor 93, diode 95, and impedance element 94 may have values and physical sizes which are small. For example, they may be smaller than the corresponding components of snubbing circuit 60, discussed above. As a result, parasitic inductance of snubbing circuit 90 is negligible. In addition, the high-frequency current path of the Z source network 80 is physically very small, having short lengths, leading to a further reduction in inductance.

In some embodiments, the components of snubbing circuit 90 are integrated into a single package. In such embodiments, the package of the snubbing circuit 90 has terminals which may be mounted to terminals of a load, such as an integrated circuit, of the Z source network 80. In some embodiments the terminals of the package of the snubbing circuit 90 may be mounted so as to contact the terminals of the load.

As shown in FIG. 8, impedance element 94 includes a resistor. In some embodiments, impedance element 94 includes another impedance network. For example impedance element 94 may include one or more resistors, capacitors, or inductors.

In some embodiments, input element 94 is omitted.

As shown in FIG. 8, capacitor 93 is a single capacitor. In some embodiments, additional impedance elements are included in series or in parallel with capacitor 93.

FIG. 8 shows a particular embodiment of a Z-Source network. Note that other embodiments may be implemented, for example, by rearranging the components of snubbing circuit 60 or by rearranging the diode 82 and shunt capacitor 81. Similarly, other embodiments may be implemented, for example, by connecting the snubbing circuit 90 at other locations in Z source network 80.

In some embodiments, impedance element 94 is configured to be controlled so as to controllably remove energy from capacitor 93. This allows for the controlled or active suppression of transient spikes. In some embodiments, impedance element 94 may include or be an energy storage element or an energy conversion element.

In some embodiments, an energy storage element or an energy conversion element may be placed in parallel with capacitor 93. This allows for the controlled or active removal of energy from capacitor 93.

Figure 9:
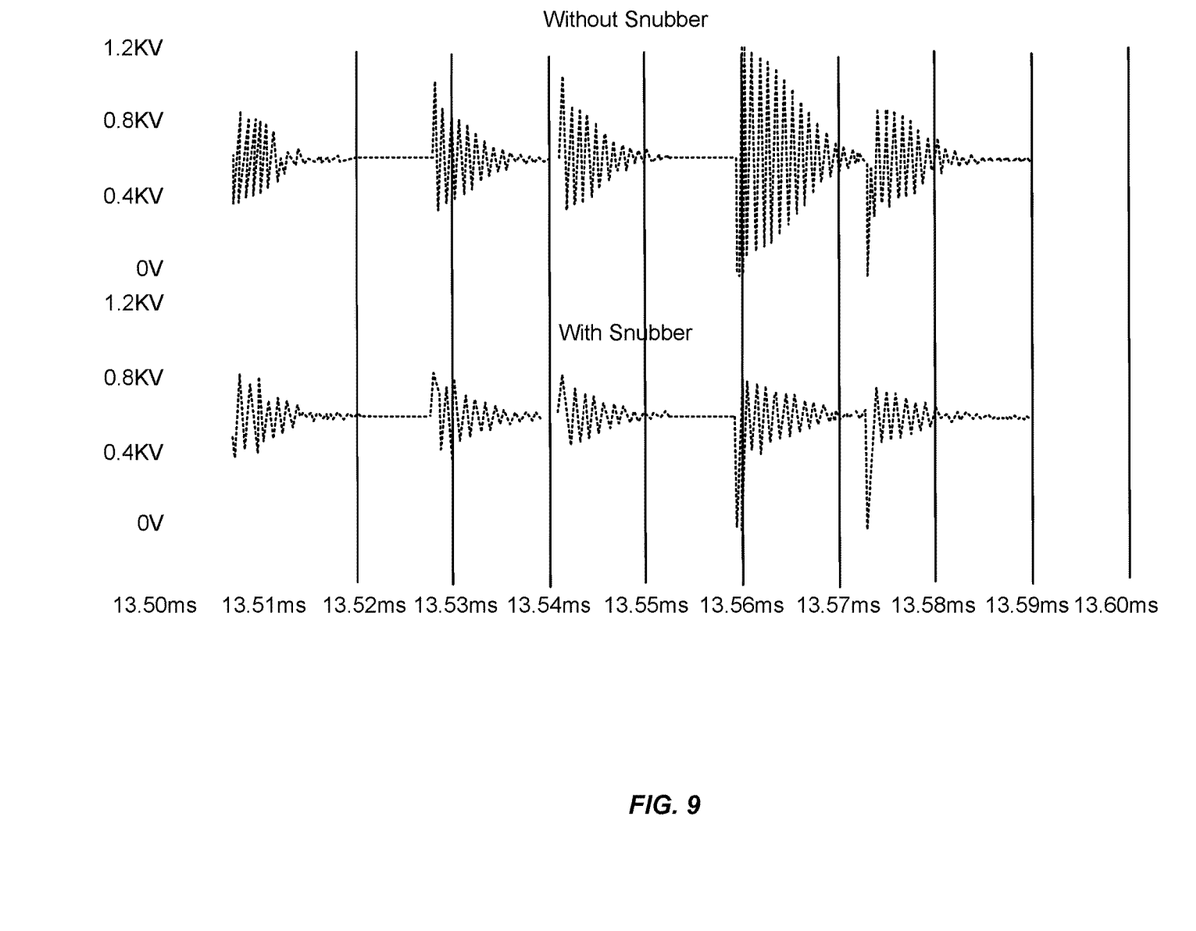
FIG. 9 is an illustration of a simulation result.

FIG. 9 shows a simulation result indicating an example of the improvement achieved by using Z source network 80. The simulation was run with a Z source network 80 providing power to a 3-phase load. The simulation result shows the voltage at the output of Z source network 80 while providing approximately 200 A sourced from a 600 VDC supply. No Z Source boost factor is used, and the IGBTs are run without deadtime, such that shoot-through events are allowed, causing the shown ringing. Parasitic inductances typical of this power level and known to those skilled in the art, were used. For the simulation, cross coupled capacitors 83 and 84 had 300 nH of equivalent series inductance (ESL). In addition, parasitic inductance from wiring and connectors to the switching devices were 100 nH. The simulated Z-Source network snubbing circuit 90 used a 2.0 uF capacitor 93 having an ESL of 20 nH. As shown, the snubbing circuit 90 in this simulation limited the peak voltage overshoots at the load to approximately +/−200V, whereas the Z source network without snubbing circuit 90 has voltage overshoots at the load of approximately +/−600V.

The present invention has been described above in terms of presently preferred embodiments so that an understanding of the present invention can be conveyed. There are, however, many configurations for network devices and management systems not specifically described herein but with which the present invention is applicable. The present invention should therefore not be seen as limited to the particular embodiments described herein, but rather, it should be understood that the present invention has wide applicability with respect to network devices and management systems generally.

What is claimed is:

1. An electrical network configured to suppress voltage transients, the network comprising:
a capacitor; and
an electrical impedance in parallel with a diode, wherein the capacitor is in series with the parallel connected diode and electrical impedance,
wherein the electrical network is configured to suppress voltage transients occurring across the series combination of the capacitor and the parallel connected diode and electrical impedance,
wherein the electrical impedance comprises a resistor, and
wherein the electrical impedance further comprises at least one of an additional resistor, an additional capacitor, and an inductor.

2. The electrical network of claim 1, wherein the electrical impedance is actively controlled.

3. The electrical network of claim 1, further comprising an energy storage element or an energy conversion element in parallel with the capacitor.

4. The electrical network of claim 1, further comprising a Z source network, wherein the series combination of the capacitor and the parallel connected diode and electrical impedance is connected across first and second nodes of the Z source network, and wherein the series combination of the capacitor and the parallel connected diode and electrical impedance is configured to suppress voltage transients occurring across the first and second nodes.

5. An electrical network configured to suppress voltage transients, the network comprising:
a first capacitor;
an electrical impedance in parallel with a diode, wherein the first capacitor is in series with the parallel connected diode and electrical impedance; and
second and third capacitors, wherein the second and third capacitors are in series with the first capacitor and the parallel connected diode and electrical impedance,
wherein the electrical network is configured to suppress voltage transients occurring across the series combination of the first capacitor, the parallel connected diode and electrical impedance, the second capacitor, and the third capacitor,
wherein the electrical impedance comprises a resistor, and
wherein the electrical impedance further comprises at least one of an additional resistor, a capacitor, and an inductor.

6. The electrical network of claim 5, wherein the electrical impedance is actively controlled.

7. The electrical network of claim 5, further comprising an energy storage element or an energy conversion element in parallel with the first capacitor.

8. The electrical network of claim 5, wherein the first capacitor, the electrical impedance, the diode, the second capacitor, and the third capacitor are integrated in a package.

9. The electrical network of claim 5, further comprising a Z source network, wherein the series combination of the first capacitor, the parallel connected diode and electrical impedance, the second capacitor, and the third capacitor is connected across first and second nodes of the Z source network, and wherein the series combination of the first capacitor, the parallel connected diode and electrical impedance, the second capacitor, and the third capacitor is configured to suppress voltage transients occurring across the first and second nodes.

10. An electrical network configured to suppress voltage transients, the network comprising:
a capacitor; and
an electrical impedance in parallel with a diode, wherein the capacitor is in series with the parallel connected diode and electrical impedance,
wherein the electrical network is configured to suppress voltage transients occurring across the series combination of the capacitor and the parallel connected diode and electrical impedance, and
wherein the electrical impedance is actively controlled.

11. The electrical network of claim 10, further comprising an energy storage element or an energy conversion element in parallel with the capacitor.

12. The electrical network of claim 10, further comprising a Z source network, wherein the series combination of the capacitor and the parallel connected diode and electrical impedance is connected across first and second nodes of the Z source network, and wherein the series combination of the capacitor and the parallel connected diode and electrical impedance is configured to suppress voltage transients occurring across the first and second nodes.

13. An electrical network configured to suppress voltage transients, the network comprising:
a capacitor;
an electrical impedance in parallel with a diode, wherein the capacitor is in series with the parallel connected diode and electrical impedance; and
an energy storage element or an energy conversion element in parallel with the capacitor, wherein the electrical network is configured to suppress voltage transients occurring across the series combination of the capacitor and the parallel connected diode and electrical impedance.

14. The electrical network of claim 13, wherein the electrical impedance further comprises at least one of an additional resistor, a capacitor, and an inductor.

15. The electrical network of claim 13, further comprising a Z source network, wherein the series combination of the capacitor and the parallel connected diode and electrical impedance is connected across first and second nodes of the Z source network, and wherein the series combination of the capacitor and the parallel connected diode and electrical impedance is configured to suppress voltage transients occurring across the first and second nodes.

16. An electrical network configured to suppress voltage transients, the network comprising:
a capacitor;
an electrical impedance in parallel with a diode, wherein the capacitor is in series with the parallel connected diode and electrical impedance; and
a Z source network, wherein the series combination of the capacitor and the parallel connected diode and electrical impedance is connected across first and second nodes of the Z source network, and wherein the series combination of the capacitor and the parallel connected diode and electrical impedance is configured to suppress voltage transients occurring across the first and second nodes.

17. The electrical network of claim 16, wherein the electrical impedance further comprises at least one of an additional resistor, a capacitor, and an inductor.

18. The electrical network of claim 16, further comprising an energy storage element or an energy conversion element in parallel with the capacitor.

19. An electrical network configured to suppress voltage transients, the network comprising:
a first capacitor;
an electrical impedance in parallel with a diode, wherein the first capacitor is in series with the parallel connected diode and electrical impedance; and
second and third capacitors, wherein the second and third capacitors are in series with the first capacitor and the parallel connected diode and electrical impedance,
wherein the electrical network is configured to suppress voltage transients occurring across the series combination of the first capacitor, the parallel connected diode and electrical impedance, the second capacitor, and the third capacitor,
wherein the electrical impedance is actively controlled.

20. The electrical network of claim 19, further comprising an energy storage element or an energy conversion element in parallel with the first capacitor.

21. The electrical network of claim 19, further comprising a Z source network, wherein the series combination of the first capacitor and the parallel connected diode and electrical impedance is connected across first and second nodes of the Z source network, and wherein the series combination of the first capacitor and the parallel connected diode and electrical impedance is configured to suppress voltage transients occurring across the first and second nodes.

22. An electrical network configured to suppress voltage transients, the network comprising:
a first capacitor;
an electrical impedance in parallel with a diode, wherein the first capacitor is in series with the parallel connected diode and electrical impedance;
second and third capacitors, wherein the second and third capacitors are in series with the first capacitor and the parallel connected diode and electrical impedance; and
an energy storage element or an energy conversion element in parallel with the first capacitor,
wherein the electrical network is configured to suppress voltage transients occurring across the series combination of the first capacitor, the parallel connected diode and electrical impedance, the second capacitor, and the third capacitor.

23. The electrical network of claim 22, wherein the electrical impedance further comprises at least one of an additional resistor, a capacitor, and an inductor.

24. The electrical network of claim 22, further comprising a Z source network, wherein the series combination of the first capacitor, the parallel connected diode and electrical impedance, the second capacitor, and the third capacitor is connected across first and second nodes of the Z source network, and wherein the series combination of the first capacitor, the parallel connected diode and electrical impedance, the second capacitor, and the third capacitor is configured to suppress voltage transients occurring across the first and second nodes.

25. An electrical network configured to suppress voltage transients, the network comprising:
a first capacitor;
an electrical impedance in parallel with a diode, wherein the first capacitor is in series with the parallel connected diode and electrical impedance; and
second and third capacitors, wherein the second and third capacitors are in series with the first capacitor and the parallel connected diode and electrical impedance,
wherein the electrical network is configured to suppress voltage transients occurring across the series combination of the first capacitor, the parallel connected diode and electrical impedance, the second capacitor, and the third capacitor, and
wherein the first capacitor, the electrical impedance, the diode, the second capacitor, and the third capacitor are integrated in a package.

26. The electrical network of claim 25, further comprising an energy storage element or an energy conversion element in parallel with the first capacitor.

27. The electrical network of claim 25, further comprising a Z source network, wherein the series combination of the first capacitor and the parallel connected diode and electrical impedance is connected across first and second nodes of the Z source network, and wherein the series combination of the first capacitor and the parallel connected diode and electrical impedance is configured to suppress voltage transients occurring across the first and second nodes.

28. An electrical network configured to suppress voltage transients, the network comprising:
a first capacitor;
an electrical impedance in parallel with a diode, wherein the first capacitor is in series with the parallel connected diode and electrical impedance;
second and third capacitors, wherein the second and third capacitors are in series with the first capacitor and the parallel connected diode and electrical impedance; and
a Z source network, wherein the series combination of the first capacitor and the parallel connected diode and electrical impedance is connected across first and second nodes of the Z source network, and wherein the series combination of the first capacitor and the parallel connected diode and electrical impedance is configured to suppress voltage transients occurring across the first and second nodes, wherein the electrical network is configured to suppress voltage transients occurring across the series combination of the first capacitor, the parallel connected diode and electrical impedance, the second capacitor, and the third capacitor.

29. The electrical network of claim 28, wherein the electrical impedance further comprises at least one of an additional resistor, a capacitor, and an inductor.

30. The electrical network of claim 28, further comprising an energy storage element or an energy conversion element in parallel with the first capacitor.

\* \* \* \* \*